United States Patent

Häuser

[11] 4,317,647
[45] Mar. 2, 1982

[54] DOSING SYSTEM

[75] Inventor: Erhard Häuser, Schöffengrund, Fed. Rep. of Germany

[73] Assignee: Wilhelm Hedrich Vakuumanlagen GmbH & Co. KG, Ehringshausen, Fed. Rep. of Germany

[21] Appl. No.: 102,926

[22] Filed: Dec. 12, 1979

[30] Foreign Application Priority Data

Dec. 18, 1978 [DE] Fed. Rep. of Germany ....... 2854687

[51] Int. Cl.³ .................. F04B 17/00; F04B 35/00
[52] U.S. Cl. ................... 417/339; 417/429; 417/390; 60/581
[58] Field of Search .............. 417/426–429, 417/390, 339, 342; 60/581, 593

[56] References Cited

U.S. PATENT DOCUMENTS

| | | | |
|---|---|---|---|
| 3,610,783 | 10/1971 | Croucher | 417/390 |
| 3,737,073 | 6/1973 | Lupert | 417/426 |
| 4,189,070 | 2/1980 | Macosko | 417/429 |

FOREIGN PATENT DOCUMENTS

| | | | |
|---|---|---|---|
| 2312647 | 9/1974 | Fed. Rep. of Germany | 417/429 |
| 887759 | 11/1943 | France | 60/581 |

Primary Examiner—William L. Freeh
Attorney, Agent, or Firm—Karl F. Ross

[57] ABSTRACT

A dosing system for one or more fluent materials, such as the components of an epoxy resin, has a support carrying a lever to which are attached at different locations the piston rods of one or more independent master cylinders. Respective conduits connect these master cylinders to respective slave cylinders in turn connected to respective stroke-type dosing pumps. The intakes of those pumps are connected to respective supplies of fluent materials and the outputs are connected to a common mixing recipient. A power cylinder connected between the lever and the support can therefore operate the master cylinders jointly to synchronously operate the respective slave cylinders and pumps to deliver to the mixing recipient volumes of the respective materials that form a ratio corresponding to that of the distances between the attachment locations for the respective master-cylinder piston rods on the lever and the pivot.

13 Claims, 1 Drawing Figure

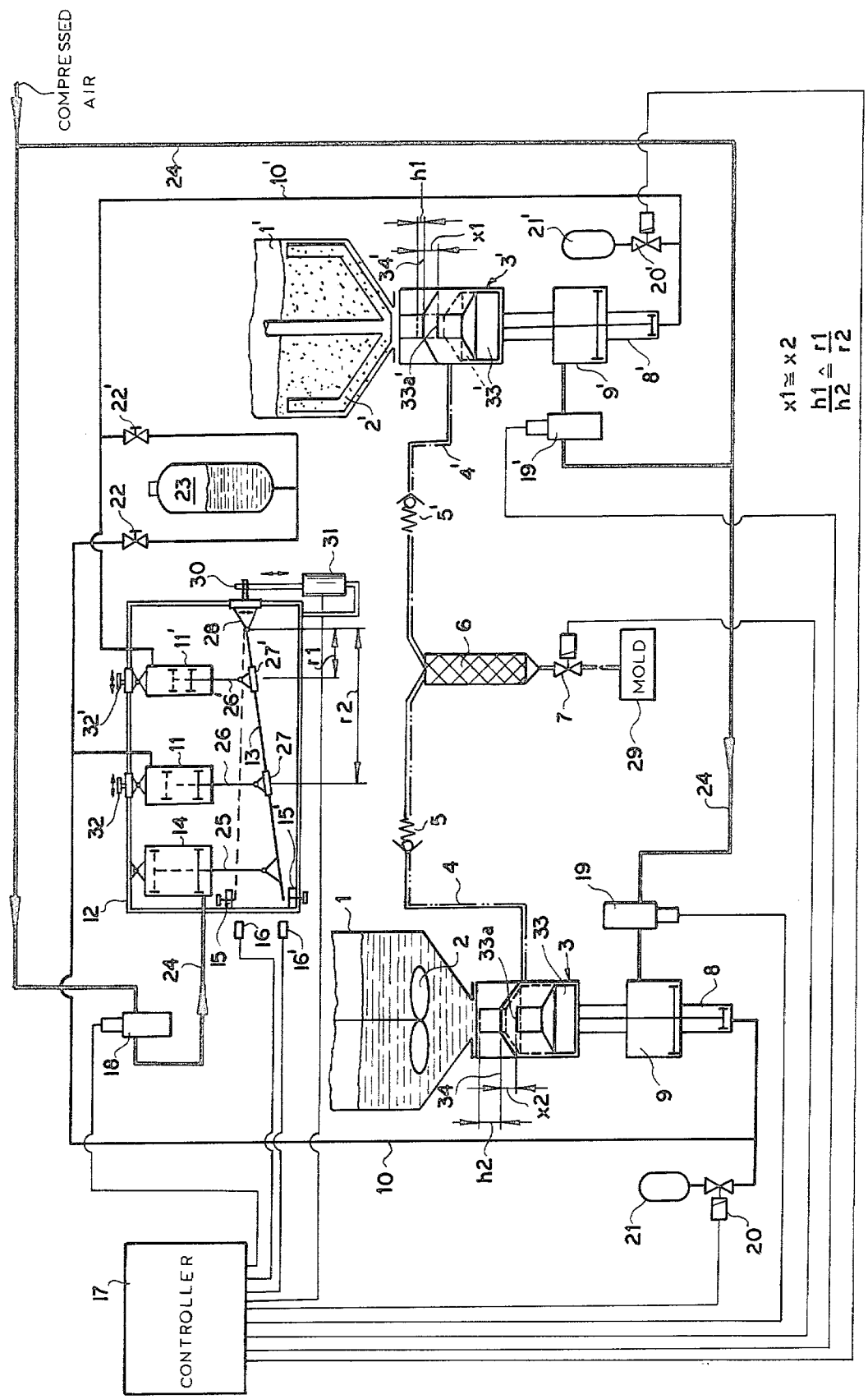

DOSING SYSTEM

FIELD OF THE INVENTION

The present invention relates to a dosing system for one or more fluid substances. More particularly this invention covers a system for delivering two fluid substances capable of reacting with each other to a mixing recipient, as in an epoxy molding machine.

BACKGROUND OF THE INVENTION

In the molding of certain synthetic-resin objects, it is necessary to mix the several components to be molded in such a manner that the relative proportions of the substances are extremely accurately controlled while the substances are maintained out of contact with each other until the last possible moment. Thus, when molding an epoxy or certain thermosetting resins, the components should be fed in exactly controlled doses to a mixing recipient and thence to the mold, remaining for as little time as possible in the mixing recipient to avoid reaction of the components and curing of the resin.

The standard systems for doing this merely have pressurized supplies of the degassed components which are connected via respective conduits having respective solenoid valves to the mixing recipient. An electronic, normally computer-controlled, command unit opens and closes these valves so that the products are exactly dosed into the mixing recipient. Such an arrangement normally requires that the product be tested extensively during setting-up of the machine, and thereafter that the product be sampled periodically in order to insure that it has the components in proper proportions.

Another arrangement uses stroke-type dosing pumps of the positive-displacement type. The stroke length for each such pump is limited to correspond to the respective portion it is to deliver. Thus, all of the dosing pumps are actuated simultaneously to deliver the components. Such an arrangement normally requires lengthy heated conduits between the dosing pumps and the mixing equipment, and other relatively complex mechanism in order to insure proper functioning.

The known machines are all relatively complex, and therefore quite expensive. Typically, the machines can only be readjusted for different components in different proportions by qualified personnel and after extensive down time. Many require extensive heated conduits between the dosing pump and the mixing recipient to maintain the components in liquid form between the mixing recipient and the dosing pumps which are normally at some distance from one another.

OBJECTS OF THE INVENTION

It is therefore an object of the present invention to provide an improved system for proportionately dosing separate fluid substances, e.g. to a mixing recipient.

Another object is to provide such a system which can easily be set up to dose different proportions, and which can even be set up to dose different numbers of components, e.g. to the mixing recipient.

A further object is to provide such a system which is relatively simple and easy to adjust.

SUMMARY OF THE INVENTION

These objects are obtained according to the invention in a system wherein each dosing pump is operated by a respective slave cylinder that is in turn operated by a respective master cylinder. A lever has one end pivoted on a support, and is connected at separate locations spaced different distances from the pivot to the master cylinders. A power cylinder, in turn, can pivot the entire lever, so that the power cylinder will be able to displace the master cylinders through strokes proportional to their distances from the pivot, and these strokes in turn will be transmitted by the hydraulic fluid, which is displaced in the master cylinders exactly to the slave cylinders for correspondingly proportional operation of the respective dosing pumps. The system can, of course, operate with a single master cylinder and related equipment for dosing only a single component.

Such an arrangement, therefore, allows the various master cylinders and power cylinder to be mounted together at a location relatively remote from the supplies to the substances being mixed. In fact, the supplies of the substances being mixed with the respective dosing pumps can be mounted extremely close to the mixing recipient, thereby greatly simplifying the construction of this invention.

The dosing pumps, according to this invention, can be of the type described in my copending application Ser. No. 938,011 filed Aug. 30, 1978 (now abandoned and replaced by application Ser. No. 237,676). Such a dosing pump has a piston displaceable along an axis and having an axially directed, e.g. frustoconical, end face surrounding an axially extended cylindrical projection. The housing surrounds this piston, and forms with the end face a compartment. This housing is formed with an axially extended cylindrical inlet port aligned with and fittable over the projection of the piston and is formed with a radial opening outlet port. As the piston is moved toward the inlet port its projection will fit into it, blocking it, so that liquid trapped between the piston and the housing is forced out of the outlet port. This pump has the considerable advantage that it clears its inlet port with each stroke, and that it can be flanged directly to the supply of the viscous material it is dosing so that lengthy conduits can be completely avoided on the inlet side.

Since the slave cylinders which operate the dosing pumps according to this invention are merely connected via hydraulic lines to the respective master cylinders, which therefore can be relatively far off, the dosing pumps with their respective supplies and slave cylinders can be mounted extremely close to the mixing recipient. In this manner there is no necessity to provide lengthy heating conduits or the like between the dosing pumps and their supplies on the one side, and the mixing recipient on the other.

According to this invention, means are provided for displacing the master cylinders on the support and lever toward and away from the lever pivot. In this manner the portions delivered by the respective dosing pumps can be controlled exactly, and will normally be directly proportional to the ratios formed by the distances between the locations on the lever where the master cylinders are attached and the lever pivot. This sysem therefore insures that with each operating cycle exactly dosed or proportioned quantities of each of the fluids will be fed e.g. to a mixing recipient.

According to a further feature of this invention, each of the dosing pumps, as described in my above-identified application, has a compartment formed with the respective intake and output, with the piston partially defining the compartment. The piston is displaceable within the respective compartment between a withdrawn end position in which the respective intake is unblocked and the respective compartment is at maximum volume, and an advanced end position in which the respective intake is blocked and the respective compartment is at minimum volume, and through an intermediate position in which the respective intake is blocked and the respective compartment is at an intermediate volume. Thus, as each piston is advanced, it first blocks the intake in the intermediate position, and then moves further, so that the fluid material captured in the compartment by the time the piston has reached the intermediate position can be pumped from the compartment.

According to this invention, at the end of each operation cycle, the pistons of the dosing pumps return to their withdrawn positions so as to refill the respective compartments. Then, prior to actuation of the power cylinder, the pistons are advanced merely to their intermediate positions. This is done by providing in the conduit between each of the outputs and the mixing recipient a biasing means constituted for example as a spring-loaded check valve that prevents fluid flow from the respective output until pressure in the respective compartment is above a predetermined relatively low level. It is also possible to provide instead of a spring-loaded check valve a valve which can be controlled, e.g. a pneumatically operated valve. The pistons are biased from the withdrawn positions at the start of each cycle inwardly with a relatively small force which is sufficient to displace these pistons into the intermediate positions, blocking the intakes, but which is insufficient to pressurize the respective chambers with a pressure greater than the predetermined low pressure, so that the pistons merely move inwardly to the intermediate positions and then stop. Subsequently the master cylinders operate the pistons from the intermediate to the advanced position with simultaneous pumping of the fluids in the compartments out through the respective outputs.

This is achieved according to the invention by pressurizing the slave cylinders to relatively low levels with respective low-pressure accumulators prior to the actuation of the power cylinder. Prior to actuation of the power cylinder, however, these accumulators are cut off from the respective dosing-pump compartments so that the single-action master and slave cylinders are directly connected for perfectly synchronous operation.

It is also possible according to this invention to periodically displace the pivot for the lever on the support in accordance with a predetermined program, or in synchronism with the operation of the power cylinder by the controller. Displacing the pivot point for the lever allows the dosing pump to execute a full opening-stroke even in systems where the respective master cylinder is pivoted extremely closely to the lever pivot. Thus the shifting of the lever pivot allows one to do away with a biasing system including an accumulator.

BRIEF DESCRIPTION OF THE DRAWING

The sole FIGURE of the drawing is a schematic view of the system according to the instant invention.

SPECIFIC DESCRIPTION

As shown in the drawing a pair of supplies 1 and 1' of fluent materials capable of reacting with each other, here a resin and a hardener to form an epoxy object, have respective mixers 2 and 2' and are mounted directly on respective dosing pumps 3 and 3' of the exact construction described in my above-cited copending application Ser. No. 938,011. These dosing pumps 3 and 3' are in turn connected via respective conduits 4 and 4' having respective spring-loaded checkvalves 5 and 5' to a flowthrough mixing recipient 6 leading via a valve 7 to a mold 29. The mold may be connected via a conduit to the recipient 6, or the resin mixture can simply be poured into the mold.

The dosing pumps 3 and 3' have respective pistons 33 and 33' which are operable in one direction by respective hydraulic slave cylinders 8 and 8' and in the opposite direction by respective pneumatic cylinders 9 and 9'. The cylinders 8 and 8' can move the pistons 33 and 33' from the illustrated solid-line withdrawn position through strokes X1 and X2 into intermediate positions and thence through strokes h1 and h2 into fully advanced positions. The intermediate position for the dosing pumps 3 and 3' is reached when the upper ends 33a and 33a' of the pistons 33 and 33' are at the level 34, 34'.

The slave cylinders 8 and 8' are connected via respective hydraulic lines 10 and 10' to the compartments of respective master cylinders 11 and 11' having cylinders mounted via adjustable holders 32 and 32' on a frame 12 and having piston rods 26 and 26' mounted via respective holders 27 and 27' on a lever 13. This lever 13 is pivoted at a pivot 28 on the frame 12, and the pivot 28 has an adjustable element 30 that allows it to be limitedly moved in line with the piston rod 26 and 26' on the frame 12. An adjustable cylinder 31 may periodically reciprocate the adjustment element 30 of the pivot 28. The mount 27' for the piston rod 26' of the cylinder 11' is spaced at a distance r1 from the pivot 28 and the mount 27 for the piston rod 26 of the cylinder 11 is mounted at a spacing r2 from the pivot 28.

A power cylinder 14 here acting as a grandmaster cylinder is mounted on the frame 12 to the left of the cylinders 11 and 11' as seen in the drawing and has a piston rod 25 connected adjacent the outer end of the lever 13. The outer end of this lever 13 is movable between end positions defined by adjustable abutments 15 and 15' and is capable of operating limit switches 16 and 16' provided at these abutments 15 and 15' and connected to a controller 17, e.g. computer-type.

The system is supplied with compressed air via a pressure line 24 that can be connected through a solenoid valve 18 to the power cylinder 14. In addition this line 24 can be connected via respective solenoid valves 19 and 19' to the outwardly effective single-action cylinders 9 and 9' that can withdraw the pistons 33 and 33'.

The hydraulic lines 10 and 10' of this system constitute completely separate and independent circuits that can be fed with hydraulic fluid from a supply 23 via normally manually operable valves 22 and 22'. The lines 10 and 10' are connected via respective valves 20 and 20' to respective low-pressure accumulators 21 and 21' of the type that stores hydraulic fluid with an increasing pressure as it is filled to a greater extent. All of the valves 7, 18, 19, 19', 20 and 20' are operated by the controller 17.

At the start of an operating cycle the pistons 33 and 33' are in their illustrated solid-line withdrawn positions so that the respective dosing-pump compartments are substantially filled with the respective fluent substances from the respective supplies 1 and 1'. The outer end of the lever 13 rests on the abutment 15' so that the switch 16' is actuated. The controller 17 keeps the valves 19 and 19' along with the valves 20 and 20' open. Cylinders 9 and 9' are pressurized to hold the pistons 33 and 33' in their withdrawn position to build up pressure to a relatively low level in the accumulators 21 and 21'. In this stage the power cylinder 14 is completely depressurized by the valve 18.

The operation cycle is then started as the controller 17 switches over the valves 19 and 19' to cut the cylinders 9 and 9' off from the high-pressure line 24, and simultaneously to depressurize the cylinders 9 and 9'. The pistons 33 and 33' of the pumps 3 and 3' therefore are moved by the pressurized hydraulic fluid contained in the accumulators 21, 21' through their respective strokes X1 and X2 into their intermediate positions. Once these positions are reached, however, the back pressure in the lines 4 and 4' prevents further displacement since the relatively low pressure effective in the cylinders 8 is not sufficient to overcome the back pressure created by these valves 5 and 5'.

Thereupon the controller simultaneously closes the valves 20 and 20' to cut the lines 10 and 10' off from the accumulators 21 and 21', and opens the valve 18 to pressurize the front compartment of the cylinder 14. The cylinder 14 will therefore pivot the lever 13 upwardly into the dashed-line position shown in the drawing, simultaneously decreasing the volume of the back compartments of both of the cylinders 11 and 11'. The slave cylinders 8 and 8' will operate exactly synchronously with the cylinders 11 and 11' to displace the respective pistons 33 and 33' through the respective stroke h2 and h1 into the fully advanced position shown in dashed lines, simultaneously forcing the respective fluid substances through the conduits 4 and 4' into the mixing recipient 6, and then through the open valve 7 into the mold 29.

when the end of the lever 13 reaches the abutment 15, which is signaled by the switch 16, the controller 17 will again switch over the valve 18 to depressurize the cylinder 14, and will open the valves 19 and 19' to make the cylinders 9 and 9' withdraw the pistons 33 and 33' back into their fully retracted positions (shown with full lines). The controller includes a timer circuit that ensures that in this phase of the cycle the valves 19 and 19' are held open for a minimal amount of time to ensure proper filling of the respective dosing pumps. As the cylinders 8 and 8' withdraw downwardly as seen in the drawing to their starting positions, hydraulic fluid is forced into the respective master cylinders 11 and 11' so that the lever 13 is pivoted down into its starting position shown in solid lines. A portion of the hydraulic fluid is forced via the just opened valves 20 and 20' into the respective accumulators 21 and 21' so as to repressurize them. Finally, at the end of this time delay, and once the abutment 15' has been engaged by the end of the lever 13, the entire cycle can be started again by depressurizing cylinders 9, 9'.

With the above-described systems the pumps 3 and 3' will deliver to the mixing recipient 6 portions that form a ratio exactly equal to the ratio of the strokes h1 and h2, which in turn is identical to the ratio of the spacings r1 and r2, although it could be different according to the diameter of the slave cylinders and/or the diameter of the master cylinders and/or the sizes of the dosing pumps. In the illustrated arrangement h1 is substantially smaller than the stroke h2. Nonetheless during the entire pivoting of the lever 13 both of the pistons 33 and 33' are moving, although the piston 33' is moving substantially more slowly. As a result fluent material will be pumped simultaneously through both of the conduits 4 and 4', but substantially more slowly through the conduit 4'. Exactly proportional dosing control is therefore ensured. In fact it has been found that the machine can normally be set up so that right from the beginning it delivers the exact proportions desired.

It is, of course, possible to use more or less than two pumps 3 and 3', in fact the system could employ a greater number of such pumps if a great number of separate ingredients need to be delivered to a recipient.

It is also possible, as described above, to reciprocate the mount 30 for the pivot 28, instead of using accumulators 21, 21' and valves 20, 20'.

With the system described above, if any of the supplies runs out the apparatus will not function. Thus, for instance, if the supply 1 runs out completely so that in a previous cycle the piston 33 is withdrawn to leave the respective pump compartment empty, when the cylinder 8 is pressurized at relatively low pressure to move it into the intermediate position it will, instead, move into the fully advanced position. Thereafter, once the respective accumulator 21 is cut off from the line 10, the power cylinder 14 will not be able to move the lever 13, as the piston 33 will be fully advanced in mechanically limited end-position and therefore unmovable, so that the respective slave cylinder 8 will also not be able to move, nor will the respective master cylinder 11. Thus, without the provision of any extra equipment the system will automatically prevent itself from operating when either of the supplies runs out.

Although discussed above with reference to a two-compartment system, it is of course to be understood that the system according to this invention can operate with virtually any number, including 1, of components. Simply by duplicating the various master and slave cylinders along with the necessary pumps and associated equipment it is very easy to set the device up for dosing of three or more components.

I claim:

1. A dosing system for a fluent material, said system comprising:
   a support;
   a lever pivoted on said support at a pivot;
   a hydraulic master cylinder connected between said support and an attachment location on said lever at a distance from said pivot, whereby on pivoting of said lever said master cylinder is moved through a stroke;
   a hydraulic slave cylinder remote from said master cylinder;
   a hydraulic conduit connecting said master cylinder to said slave cylinder for joint and synchronous operation of said slave cylinder with said master cylinder;
   a stroke-type dosing pump connected to said slave cylinder for joint displacement therewith and having a piston, an intake, and an output, said pump being adapted and arranged to pump from the respective output a volume directly proportionate to the stroke through which said piston is actuated in a forward direction by said slave cylinder;
   a supply of said fluent material connected to said intake;
   a power cylinder connected between said lever and said support; and
   control means for pressurizing said power cylinder and thereby displacing said slave cylinder and pump through strokes proportionate to said distance and for depressurizing said power cylinder and actuating said piston in a backward direction opposite said forward direction independently of operation of said cylinders.

2. The system defined in claims 1, further comprising means for displacing and fixing said locations along said lever.

3. The dosing system defined in claim 1, further comprising:
a second such hydraulic master cylinder connected between said support and a second attachment location on said lever at a second spacing from said pivot, whereby on pivoting of said lever said second master cylinder is moved through a stroke;
a second such hydraulic slave cylinder remote from both of said master cylinders;
a second such hydraulic conduit connecting said second master cylinder to said second slave cylinder for joint and synchronous operation of said second slave cylinder with said second master cylinder;
a second stroke-type dosing pump connected to said second slave cylinder for joint displacement therewith and having an intake and an output, said second pump being adapted and arranged to pump from the respective output a volume directly proportionate to the stroke through which it is actuated by said second slave cylinder; and
a second supply of a second fluent material connected to said intake of said second pump.

4. The dosing system defined in claim 1, further comprising:
a plurality of such hydraulic master cylinders connected between said support and a plurality of respective attachment locations on said lever at respective spacings from said pivot, whereby on pivoting of said lever said master cylinders are moved through strokes;
a same plurality of such hydraulic slave cylinders remote from said master cylinders;
a same plurality of such hydraulic conduits, each conduit connecting one of said master cylinders to one of said slave cylinders for joint and synchronous operation of said slave cylinders with said master cylinders;
a same plurality of stroke-type dosing pumps, each dosing pump being connected to a respective slave cylinder for joint displacement therewith and having an intake and an output, said pumps being adapted and arranged to pump from the respective output a volume directly proportionate to the stroke through which it is actuated by said respective slave cylinder; and
a same plurality of supplies of fluent materials connected to said intakes of said pumps.

5. The system defined in claims 3, further comprising a mixing recipient connected to said outputs for receiving the materials from said pumps.

6. The system defined in claims 1 wherein said control means includes respective draw-back cylinders connected to said pumps for urging same in a direction opposite that of the respective slave cylinders.

7. The system defined in claim 6, further comprising means for urging the piston of said draw-back cylinders towards the force of the respective slave cylinder during displacement of said slave cylinder from its retracted position in its advanced position.

8. A dosing system for a fluent material, said system comprising:
a support;
a lever pivoted on said support at a pivot;
a hydraulic master cylinder connected between said support and an attachment location on said lever at a distance from said pivot, whereby on pivoting of said lever said master cylinder is moved through a stroke;
a hydraulic slave cylinder remote from said master cylinder;
a hydraulic conduit connecting said master cylinder to said slave cylinder for joint and synchronous operation of said slave cylinder with said master cylinder;
a stroke-type dosing pump connected to said slave cylinder for joint displacement therewith and having an intake and an output, said pump being adapted and arranged to pump from the respective output a volume directly proportionate to the stroke through which it is actuated by said slave cylinder;
a supply of said fluent material connected to said intake;
a power cylinder connected between said lever and said support; and
control means for pressurizing said power cylinder and thereby displacing said slave cylinder and pump through strokes proportionate to said distance, said control means including a pair of end switches alternately actuatable by said lever at opposite ends of its angular displacement for controlling the pumping cycle.

9. A dosing system for fluent materials, said system comprising:
a support;
a lever pivoted on said support at a pivot;
first and second hydraulic master cylinders connected between said support and respective first and second attachment locations on said lever at respective first and second distances from said pivot, whereby on pivoting of said lever said master cylinders are moved through respective strokes;
respective first and second hydraulic slave cylinders remote from the respective master cylinders;
respective first and second hydraulic conduits connecting said master cylinders to the respective slave cylinders for joint and synchronous operation of said slave cylinders with the respective master cylinders;
respective first and second stroke-type dosing pumps connected to said slave cylinders for joint displacement therewith and each having a respective intake and output, said pumps being adapted and arranged to pump from the respective outputs a volume directly proportionate to the stroke through which they are actuated by the respective slave cylinders, said pumps each having a pump compartment formed with the respective intake and output and a piston displaceable in said compartment between positions blocking and opening the respective intake;
means for displacing said pistons into said positions at least partially independently of operation of said cylinders;
respective first and second supplies of said fluent materials connected to said intakes;
a power cylinder connected between said lever and said support; and
control means for pressurizing said power cylinder and thereby displacing said slave cylinders and pumps through strokes proportionate to the respective distances.

10. The system defined in claim 9 wherein the last-mentioned means includes means for displacing said pivot relative to said support.

11. The system defined in claim 9 wherein the last-mentioned means includes hydraulic accumulators, connectable to and disconnectable from the respective hydraulic conduits.

12. The system defined in claim 9 wherein said accumulators accumulate hydraulic fluid under increasing pressure and are loaded and unloaded from the respective conduits over cutoff valves between said accumulators and the respective conduits and means for controlling said cutoff valves in accordance with the pump strokes.

13. The system defined in claim 12 wherein each of said last-mentioned means includes a spring-loaded valve at the respective output and openable at a pressure greater than the pressure in the fluent material created by the respective accumulator when the intake of the dosing pump is closed.

* * * * *